US012396470B2

(12) United States Patent
Benjamin et al.

(10) Patent No.: US 12,396,470 B2
(45) Date of Patent: Aug. 26, 2025

(54) OIL-IN-WATER EMULSION CONTAINING FIRST FLOUR AND SECOND FLOUR HIGH IN AMYLOPECTIN

(71) Applicant: Conopco, Inc., Englewood Cliffs, NJ (US)

(72) Inventors: Mia Claire Benjamin, Voorburg (NL); Jadwiga Malgorzata Bialek, Bedford (GB); Meliana Ko, 3067 RN Rotterdam (NL); Robert Vreeker, Melissant (NL)

(73) Assignee: Conopco, Inc., Englewood Cliffs, NJ (US)

( * ) Notice: Subject to any disclaimer, the term of this patent is extended or adjusted under 35 U.S.C. 154(b) by 1370 days.

(21) Appl. No.: 15/512,906

(22) PCT Filed: Sep. 8, 2015

(86) PCT No.: PCT/EP2015/070482
§ 371 (c)(1),
(2) Date: Mar. 21, 2017

(87) PCT Pub. No.: WO2016/050458
PCT Pub. Date: Apr. 7, 2016

(65) Prior Publication Data
US 2017/0251708 A1   Sep. 7, 2017

(30) Foreign Application Priority Data
Sep. 30, 2014  (EP) ................................ 14187058

(51) Int. Cl.
*A23L 27/60* (2016.01)
*A23L 29/212* (2016.01)

(52) U.S. Cl.
CPC ............. *A23L 27/60* (2016.08); *A23L 29/212* (2016.08); *A23V 2002/00* (2013.01)

(58) Field of Classification Search
CPC .... A23L 29/212; A23L 27/60; A23V 2002/00
See application file for complete search history.

(56) References Cited

U.S. PATENT DOCUMENTS

| 2,338,083 A | 1/1944 | Buchanan et al. |
| 2,653,876 A | 9/1953 | Hanson et al. |
| (Continued) | | |

FOREIGN PATENT DOCUMENTS

| EP | 2589299 | 5/2013 |
| EP | 2679101 | 1/2014 |
| (Continued) | | |

OTHER PUBLICATIONS

Park et al., "Gelatinization and Pasting Properties of Waxy and Non-waxy Rice Starches". Starch 59 (2007) 388-396. (Year: 2007).*

(Continued)

*Primary Examiner* — Erik Kashnikow
*Assistant Examiner* — Assaf Zilbering
(74) *Attorney, Agent, or Firm* — B.V. Nederlandsch Octrooibureau

(57) ABSTRACT

The present invention relates to a composition in the form of an oil-in-water emulsion, containing a first flour and a second flour and/or a third starch, wherein the first flour comprises flour obtained from pulse seed, or comprises flour obtained from plants of one or more of the genera *Solanum* and *Manihot*. The second flour comprises flour obtained from plants of the genus *Oryza*, and the third starch comprises waxy rice starch. The invention also relates to a method for preparation of the composition. The invention further relates to the use of the first flour, the second flour and/or the third starch to reduce syneresis in an oil-in-water emulsion, and to control breakdown of an oil-in-water emulsion in the mouth.

13 Claims, 2 Drawing Sheets

(56) References Cited

U.S. PATENT DOCUMENTS

| | | | |
|---|---|---|---|
| 4,690,829 | A | 9/1987 | Usui |
| 5,759,581 | A | 6/1998 | Baensch et al. |
| 2004/0142089 | A1 | 7/2004 | Hisatomi |
| 2008/0181990 | A1 | 7/2008 | Ledbetter et al. |
| 2013/0260008 | A1 | 10/2013 | Bialek et al. |
| 2014/0113013 | A1 | 4/2014 | Samoto et al. |
| 2017/0251708 | A1 | 9/2017 | Benjamin et al. |

FOREIGN PATENT DOCUMENTS

| | | | |
|---|---|---|---|
| EP | 3200616 | | 7/2019 |
| WO | WO02069737 | | 9/2002 |
| WO | WO2012089448 | | 7/2012 |
| WO | WO2013067453 | | 5/2013 |
| WO | WO-2013067453 | A1 * | 5/2013 |
| WO | WO2013092023 | | 6/2013 |
| WO | WO2013092086 | | 6/2013 |
| WO | WO2014001016 | | 1/2014 |
| WO | WO2014001030 | | 1/2014 |
| WO | WO2014001031 | | 1/2014 |
| WO | WO2014095180 | | 6/2014 |
| WO | WO2016050458 | | 4/2016 |

OTHER PUBLICATIONS

IPRP in PCTEP2015070482, Dec. 23, 2016 (NPL 1, pp. 1-50).
Ortega-Ojeda, Gelantinisation and Retrogradation Behaviour of Some Starch Mixtures, Starch-Starke, Jan. 1, 2001, pp. 520-529, 53 (10), SE (NPL 1, pp. 51-60).
Search Report and Written Opinion in EP14187058, Mar. 5, 2015 (NPL 1, pp. 61-66).
Search Report and Written Opinion in PCTEP2015070482, Nov. 26, 2015 (NPL 1, pp. 67-78).
Yao et al., Retrogradation of Starch Mixtures Containing Rice Starch, Food Engineering and Physical Properties, Jan. 1, 2003, pp. 260-265, 68 (1), US (NPL 1, pp. 79-84).
Obanni et al.; Properties of Some Starch Blends; Cereal Chemistry; Jan. 1, 1997; pp. 431-436; vol. 74 Issue 4.
Zhen et al.; Rheological, physical stability, microstructural and sensory properties of salad dressings supplemented with raw and thermally treated lentil flour; Journal of Food Engineering; 2013; pp. 862-872; XP002764554 and XP002765080; vol. 116, No. 4; Elsevier.
Marrs WM; Prepared Fods; Blending starches, gums provides texture and processing benefits; 1997; 63-66—Abstract Only; 166 (10).
Deshpande et al; Journal of Food Science; Functional properties of wheat-bean composite flours; 1983; 1659-62; 48 (6).
Maiolino D; Food Processing; Starches can improve mouthfeel for salad dressings; 2002; 42, 44—Abstract only; 63 (3).
Anonymous; Food Processing; Taking the yolk out of dressings; 1991; 13—Abstract only; 60 (3).
Gorecka et al; Food Science and Technology Abstracts; A study on the application of modified starches in the production of low-fat and cholesterol free mayonnaise emulsions; 2004; 77-84 + abstract; 11 (3, suppl).
Anon; Food Design; Competition for eggs; 2006; 30-32—Abstract only.
Schmidt S; Food Design; Food Design; 2005; 34-35—Absract only; 3.
Blunt, J; Food Marketing & Technology.; From wheat to meat and mayonnaise. New stabilizer blends and proteins bring innovation to the food industry; 2006; 10-12—Abstract only; 20 No. 6.
Gray, D; Food Ingredients and Analysis International; New functional ingredients and additives for sauces and dressings; 2002; 28, 30—Abstract only; 24 (4).
Vom Dorp et al; Lebensmitteltechnik; Strongly lipophilic. A new generation of functional starches and their application possibilities; 2002; 52-53—Abstract only; 34 (12).
Goudappel et al.; Measurement of Oil Droplet Size Distributions in Food Oil/Water Emulsions by Time Domain Pulsed Field Gradient NMR; Journal of Colloid and Interface Science; 2001; 535-542; vol. 239.
Alderliesten, M.; "Mean Particle Diameters. Part II: Standardization of nomenclature"; Particle & Particle Systems Characterization; 1991; pp. 237-241; 8.
Balanced Mayonnaise Record ID 810235; Mintel GNPD; 2 pages.
Egg-Free Mayonnaise Range Record ID 899314; Mintel GNPD; 2008; 2 pages.
Just Mayo, Record ID 2297023; Mintel GNPD; 2014; 3 pages.
Light Mayonnaise, Record ID 1005602; Mintel GNPD; 2008; 3 pages.
Light Mayonnaise, Record ID 1527163; Mintel GNPD; 2011; 3 pages.
Maionese de Tremoco Mayonnaise, Record ID 315562; Mintel GNPD; 2004; 2 pages.
Mayonnaise, Record ID 702513; Mintel GNPD; 2007; 2 pages.
Mayonnaise, Record ID 1535079; Mintel GNPD; 2011; 4 pages.
Organic Salad Mayonnaise, Record ID 1938829; Mintel GNPD; 2012; 3 pages.
Salad Mayonnaise, Record ID 1816321; Mintel GNPD ; 2012; 3 pages.
Salad Mayonnaise Record ID 2160499 3 pages 2013; Mintel GNPD; 2013; 3.
Vegan Mayonnaise, Record ID 2014563; Mintel GNPD; 2013; 3 pages.
Vegenaise and Horseradish Sauce Record ID 1754863; Mintel GNPD; 2012; 3.

* cited by examiner

OIL-IN-WATER EMULSION CONTAINING FIRST FLOUR AND SECOND FLOUR HIGH IN AMYLOPECTIN

FIELD OF THE INVENTION

The present invention relates to a composition in the form of an oil-in-water emulsion, containing a first flour and a second flour and/or a third starch, wherein the first flour comprises flour obtained from pulse seed, or comprises flour obtained from plants of one or more of the genera *Solanum* and *Manihot*. The second flour comprises flour obtained from plants of the genus *Oryza*, and the third starch comprises waxy rice starch. The invention also relates to a method for preparation of the composition. The invention further relates to the use of the first flour, the second flour and/or the third starch to reduce syneresis in an oil-in-water emulsion, and to control breakdown of an oil-in-water emulsion in the mouth.

BACKGROUND TO THE INVENTION

Consumers are becoming more and more interested in natural foods, meaning food products in which the number of ingredients that can be perceived to be artificial has been reduced or are even absent. Ideally a food product contains only natural ingredients, which are recognisable for the consumer, and which are considered to be artisanal or traditionally present in such food products. For example, the consumer generally does not like additives like preservatives, or colourants, therefore such compounds ideally should not be present in food products. Another example of such ingredients are chemically modified starches used as thickener and stabiliser, for example in reduced fat mayonnaises. These modified starches have excellent properties from technical viewpoint, but have a negative image as an artificial food ingredient. Therefore food industry has a strong drive to prepare food products which only contain natural ingredients.

Another driver for mayonnaise and dressings manufacturers is that more and more consumers are interested in vegan mayonnaise, meaning that these emulsions should not contain any ingredients from animal origin. Eggs or egg yolk are traditional ingredients of mayonnaise, however vegan mayonnaise should not contain egg or egg yolk. The phospholipids in egg yolk serve as emulsifier to stabilise dispersed oil droplets in a continuous aqueous phase. In a vegan mayonnaise the egg yolk should be replaced by an emulsifier from vegetable origin, in order to stabilise the vegetable oil droplets in a continuous aqueous matrix. In addition many light mayonnaises (mayonnaises containing less oil than regular full fat mayonnaise) contain modified starches as stabiliser of the aqueous phase.

A third driver for consumers is to reduce their fat intake, without compromising on the type of food products that they consume and without loss of quality compared to full fat variants. Hence, reduced fat mayonnaises and dressings have been a success on the market. These products generally contain thickeners like starches or flours to stabilise the aqueous phase and provide sufficient body to these products.

Pulse seeds are known to be used in food products and emulsions.

WO 2012/089448 A1 relates to emulsions comprising ground pulse seed.

WO 2014/001031 A1 relates to a water-in-oil-emulsion with gelatinized starch; and pulse seed globulin.

WO 2014/001016 A1 relates to an emulsion containing gelatinized starch and pulse seed albumin; and a non-starch polysaccharide of low charge density.

WO 2014/001030 A1 relates to an emulsion with gelatinized starch; and pulse seed albumin and a polysaccharide thickener selected from xanthan gum and/or pectin.

Emulsions free from egg products are also known.

WO 2013/067453 A1 relates to an egg substitute and compositions comprising the egg substitute.

EP 2 679 101 A1 relates to an edible oil-in-water emulsion, containing modified starch.

WO 2013/067453 relates to an egg substitute and compositions comprising the egg substitute, with a pea protein isolate and modified starch.

US 2014/0113013 A1 relates to a food or beverage in which a soybean-derived material is used as an ingredient, for example to replace egg yolk.

Retrogradation has been investigated, and methods to reduce retrogradation have been described.

U.S. Pat. No. 4,690,829 relates to a method of preventing retrogradation of foodstuffs.

U.S. Pat. No. 2,338,083 relates to a salad dressing containing corn starch and waxy corn starch.

U.S. Pat. No. 2,653,876 relates to cooked food products of sauce-like consistency comprising an edible liquid thickened with an amylaceous material at least 20% of which is waxy rice.

U.S. Pat. No. 5,759,581 relates to a texture agent comprising non crystalline particles of high amylose starch, which can be used as fat replacer in food products.

M. Obanni et al. (Cereal Chemistry 74(4), 431-436, 1997) relates to the interaction between starch molecules from different origins.

Y. Yao et al. (JFS: Food Engineering and Physical Properties 68(1), 260-265, 2003) relates to retrogradation behaviour of starch mixtures.

Ortega-Ojeda et al. (Starch-Starke 53(10), 520-529, 2001) relates to gelatinization and retrogradation of some starch mixtures.

SUMMARY OF THE INVENTION

The consumer is interested in mayonnaises and dressings which have a low fat content, which contain natural thickeners and stabilisers, and which additionally may be free from eggs. Nevertheless, the oil-in-water emulsions should be stable during storage and shelf-life, meaning for example that the compositions should not expel water due to syneresis, or should not show creaming of oil droplets, as the oil droplets are not well emulsified. Additionally, the use of starches, in particular waxy starches, in emulsions may lead to sticky or slimy dressings and mayonnaises, which the consumers generally dislike. Additionally, the natural thickener systems of the prior art, notably based on pulse seeds like lentil and chickpea, generally lead to syneresis of emulsions. This may be caused by the high concentration of amylose present in pulse seed, leading to retrogradation. Therefore there is a need for oil-in-water emulsions containing a thickener system which is natural, which provides stability to the emulsion during storage of the emulsion, which are not slimy or sticky, and which ideally are free from eggs.

We have now found that stable oil-in-water emulsions can be prepared by using a first flour containing at least 35% starch, less than 35% protein, and less than 10% lipids, based on the dry weight of the flour, and combining this with a second flour which contains at least 60% starch, based on dry weight of the flour, of which the amylose content is maximally 5% of the starch content. The first flour may also be combined with a third starch which contains maximally 5% amylose, or with a combination of the second flour and third starch. The first flour comprises flour obtained from pulse seed, or comprises flour obtained from plants of one or more of the genera *Solanum* and *Manihot*. The second flour comprises flour obtained from plants of the genus *Oryza*, and/or the third starch comprises waxy rice starch. The flours and starches are preferably not chemically and not enzymatically modified, meaning that they are preferably native flours and native starches.

This combination of flours and/or starch leads to physically stable oil-in-water emulsions, with strongly reduced, or even eliminated syneresis upon storage. Importantly, in spite of the presence of starches in the emulsions, the emulsions are not sticky, because breakdown of the emulsion in the mouth can be effectively controlled by the specific combination of flours and/or starch of the invention. When subjected to shear, for example upon consumption, in the mouth, the emulsions break down easier than the emulsions containing only a flour rich in amylopectin. This leads to less sticky and less viscous products upon consumption.

Accordingly in a first aspect the invention provides a composition in the form of an oil-in-water emulsion having a pH ranging from 3 to 5, comprising:
a) from 10% to 70% by weight of oil;
b) from 0.1% to 10% by weight of acid;
c) from 0.5 to 10% by weight of one or more first flours, wherein the first flour comprises:
   starch at a concentration of at least 35% based on the dry weight of the first flour, wherein the amylose content of the starch ranges from 15% to 60% by dry weight of the starch;
   protein at a concentration of maximally 35% based on the dry weight of the first flour;
   lipids at a concentration of maximally 10% based on the dry weight of the first flour; and
   wherein the first flour comprises flour obtained from pulse seed having the following composition, calculated on dry weight of the raw pulse seed:
   35 to 60 wt % of starch;
   15 to 35 wt % of protein;
   0.8-10 wt % of lipids,
   1 to 40 wt % of dietary fibre, and
   0.5 to 12 wt % of sugars;
   or wherein the first flour comprises flour obtained from plants of one or more of the genera *Solanum* and *Manihot*; and
d) from 0.5 to 10% by weight of a second flour comprising flour obtained from plants of the genus *Oryza*, and/or a third starch comprising waxy rice starch, wherein the second flour comprises starch at a concentration of at least 60% based on the dry weight of the second flour, wherein the amylose content of the starch in the second flour is maximally 5% by dry weight of the starch, and wherein the amylose content of the third starch is maximally 5% by weight of the starch.

In a second aspect the invention provides a method for preparation of a composition according to any one of the preceding claims, comprising the steps:
a) mixing water and one or more first flours,
   wherein the first flour comprises flour obtained from pulse seed having the following composition, calculated on dry weight of the raw pulse seed:
   35 to 60 wt % of starch;
   15 to 35 wt % of protein;
   0.8-10 wt % of lipids,
   1 to 40 wt % of dietary fibre, and
   0.5 to 12 wt % of sugars;
   or wherein the first flour comprises flour obtained from plants of one or more of the genera *Solanum* and *Manihot*; and
   a second flour comprising flour obtained from plants of the genus *Oryza*, and/or a third starch comprising waxy rice starch at a temperature below 60° C.;
b) heating the mixture from step a) from a temperature below 60° C. to a temperature ranging from 75 to 95° C., and keeping the mixture at that temperature during a time period of at least 2 minutes;
c) adding oil to the mixture from step b) and dispersing the oil in the mixture, preferably using a high shear mixer;
d) optionally homogenising the mixture of step c) to create an oil-in-water emulsion wherein the oil droplets have a volume weighted mean droplet size D3,3 of less than 15 micrometer; and
e) adding a food-grade acid to the mixture of step d), to a pH ranging from 3 to 5.

In a third aspect the invention provides use of one or more first flours, wherein the first flour comprises:
starch at a concentration of at least 35% based on the dry weight of the first flour, wherein the amylose content of the starch ranges from 15% to 60% by dry weight of the starch;
protein at a concentration of maximally 35% based on the dry weight of the first flour;
lipids at a concentration of maximally 10% based on the dry weight of the first flour; and wherein the first flour comprises flour obtained from pulse seed having the following composition, calculated on dry weight of the raw pulse seed:
35 to 60 wt % of starch;
15 to 35 wt % of protein;
0.8-10 wt % of lipids,
1 to 40 wt % of dietary fibre, and
0.5 to 12 wt % of sugars;
or wherein the first flour comprises flour obtained from plants of one or more of the genera *Solanum* and *Manihot*;
and a second flour comprising flour obtained from plants of the genus *Oryza*, and/or a third starch comprising waxy rice starch,
wherein the second flour comprises starch at a concentration of at least 60% based on the dry weight of the second flour, wherein the amylose content of the starch in the second flour is maximally 5% by dry weight of the starch, and wherein the amylose content of the third starch is maximally 5% by weight of the starch; to reduce syneresis in an oil-in-water emulsion.

Alternatively, in a third aspect the invention provides use of one or more first flours, wherein the first flour comprises:
starch at a concentration of at least 35% based on the dry weight of the first flour, wherein the amylose content of the starch ranges from 15% to 60% by dry weight of the starch;
protein at a concentration of maximally 35% based on the dry weight of the first flour;
lipids at a concentration of maximally 10% based on the dry weight of the first flour; and wherein the first flour comprises flour obtained from pulse seed having the following composition, calculated on dry weight of the raw pulse seed:
35 to 60 wt % of starch;
15 to 35 wt % of protein;

0.8-10 wt % of lipids,
1 to 40 wt % of dietary fibre, and
0.5 to 12 wt % of sugars;
or wherein the first flour comprises flour obtained from plants of one or more of the genera *Solanum* and *Manihot;* and a second flour comprising flour obtained from plants of the genus *Oryza,* and/or a third starch comprising waxy rice starch,
wherein the second flour comprises starch at a concentration of at least 60% based on the dry weight of the second flour, wherein the amylose content of the starch in the second flour is maximally 5% by dry weight of the starch, and
wherein the amylose content of the third starch is maximally 5% by weight of the starch; to control breakdown of an oil-in-water emulsion in the mouth.

DETAILED DESCRIPTION OF THE INVENTION

All percentages, unless otherwise stated, refer to the percentage by weight (wt %). D4,3 is the volume weighted mean diameter of a set of droplets or particles. The volume based diameter equals the diameter of a sphere that has the same volume as a given particle (M. Alderliesten, Particle & Particle Systems Characterization 8 (1991) 237-241).

'Spoonable' means that a composition is semi-solid but not free-flowing on a time scale typical for eating a meal, meaning not free-flowing within a time period of an hour. A sample of such substance is able to be dipped with a spoon from a container containing the composition.

'Pourable' is understood to mean that a composition is free-flowing; generally a spoon is not required to take a sample from a container containing a pourable composition. Except in the operating and comparative examples, or where otherwise explicitly indicated, all numbers in this description indicating amounts or ratios of material or conditions of reaction, physical properties of materials and/or use are to be understood as modified by the word 'about'.

Mayonnaise is generally known as a thick, creamy sauce that can be used as a condiment with other foods. Mayonnaise is a stable water-continuous emulsion of vegetable oil, egg yolk and either vinegar or lemon juice. In many countries the term mayonnaise may only be used in case the emulsion conforms to the 'standard of identity', which defines the composition of a mayonnaise. For example, the standard of identity may define a minimum oil level, and a minimum egg yolk amount. Also mayonnaise-like products having oil levels lower than defined in a standard of identity can be considered to be mayonnaises. These kind of products often contain thickeners like starch to stabilise the aqueous phase. Mayonnaise may vary in colour, and is generally white, cream-coloured, or pale yellow. The texture may range from of light creamy to thick, and generally mayonnaise is spoonable. In the context of the present invention 'mayonnaise' includes emulsions with oil levels ranging from 5% to 85% by weight of the product. Mayonnaises in the context of the present invention do not necessarily need to conform to a standard of identity in any country.

The term 'oil' as used herein refers to lipids selected from triglycerides, diglycerides, monoglycerides and combinations thereof. Preferably the oil in the context of this invention comprises at least 90 wt % of triglycerides, more preferably at least 95 wt %. Typically, 40 to 100 wt %, more preferably 50 to 100 wt % and most preferably 60 to 100 wt % of the fatty acids contained in the dispersed oil phase are unsaturated fatty acids. Preferably the oil contains less than 20 wt % of solid oil at 5° C., preferably less than 10 wt % solid oil. More preferred the oil is free from solid oil at 5° C. Most preferred the oil is liquid at 5° C. Preferred oils for use in the context of this invention are vegetable oils which are liquid at 5° C. Preferably the oil comprises sunflower oil, rapeseed oil, olive oil, soybean oil, and combinations of these oils. The terms 'oil' and 'fat' may be used interchangeably herein, and should be regarded to be synonyms.

The term 'native' means in the context of the present invention, that a flour or a starch has not been chemically modified, for example by mixing the flour or starch with a chemical compound with the intention to attach chemical groups to molecules in the protein or starch, or to crosslink such molecules, or similar chemical modifications. The flour or starch neither has been enzymatically modified, meaning treated with enzyme in order to modify the chemical compositions. 'Native' may mean that the flour or starch has been heated, with or without water.

In a first aspect the invention provides a composition in the form of an oil-in-water emulsion having a pH ranging from 3 to 5, comprising:
a) from 10% to 70% by weight of oil;
b) from 0.1% to 10% by weight of acid;
c) from 0.5 to 10% by weight of one or more first flours, wherein the first flour comprises:
starch at a concentration of at least 35% based on the dry weight of the first flour, wherein the amylose content of the starch ranges from 15% to 60% by dry weight of the starch;
protein at a concentration of maximally 35% based on the dry weight of the first flour;
lipids at a concentration of maximally 10% based on the dry weight of the first flour; and
wherein the first flour comprises flour obtained from pulse seed having the following composition, calculated on dry weight of the raw pulse seed:
35 to 60 wt % of starch;
15 to 35 wt % of protein;
0.8-10 wt % of lipids,
1 to 40 wt % of dietary fibre, and
0.5 to 12 wt % of sugars;
or wherein the first flour comprises flour obtained from plants of one or more of the genera *Solanum* and *Manihot*; and
d) from 0.5 to 10% by weight of a second flour comprising flour obtained from plants of the genus *Oryza,* and/or a third starch comprising waxy rice starch, wherein the second flour comprises starch at a concentration of at least 60% based on the dry weight of the second flour, wherein the amylose content of the starch in the second flour is maximally 5% by dry weight of the starch, and wherein the amylose content of the third starch is maximally 5% by weight of the starch.

Preferably the composition is an edible emulsion. Examples of oil-in-water emulsions encompassed by the present invention include mayonnaise, dressings, soups, sauces and drinks. Preferably, the oil-in-water emulsion is a mayonnaise or a dressing, most preferably a mayonnaise or dressing. Generally such a preferred mayonnaise is spoonable. Preferably, the amount of oil ranges from 15 to 60% by weight in the composition of the invention. Preferably the amount of oil ranges from 20% to 60% by weight, preferably from 20% to 55% by weight. Preferably the dispersed oil phase represents at least 25 wt %, more preferred at least 30 wt % of the composition. Preferably the composition of the invention is a low fat mayonnaise.

The emulsions according to the present invention typically are pourable or spoonable as opposed to solid. In case the present emulsion is non-pourable, it is preferred that the consistency of the emulsion is such that it cannot be cut in two, as the parts of the emulsion that have been divided by the cutting will confluence after the cutting.

The amount of acid is such that the pH ranges from 3 to 5, preferably from 3 to 4.6. Suitable acids are selected from acetic acid, citric acid, lactic acid, malic acid, phosphoric acid, hydrochloric acid, glucono-delta-lactone and combinations thereof. Preferably, the emulsions comprises acetic acid, citric acid or combinations thereof.

The composition of the invention comprises a first flour containing starch, protein, and lipids. The term 'protein' as used herein refers to a linear polypeptide comprising at least 10 amino acid residues. Preferably, said protein contains more than 20 amino acid residues. Typically, the protein contains not more than 35,000 amino acid residues. The term 'lipid' as used herein refers to lipids selected from the group of triglycerides, diglycerides, monoglycerides, phospholipids and free fatty acids. The term 'lipid' encompasses lipids that are liquid at ambient temperature as well as lipids that are partially or completely solid at ambient temperature.

Preferably the first flour contains starch at a concentration of at least 40% based on the dry weight of the first flour. Preferably the amylose content of the starch ranges from 15% to 50% by dry weight of the starch, more preferred from 20% to 50% by weight, more preferred from 20% to 45% by weight. Preferably the first flour comprises protein at a concentration of maximally 30% based on the dry weight of the first flour. Preferably the first flour comprises lipids at a concentration of maximally 8% based on the dry weight of the first flour.

The composition of the invention comprises from 0.5 to 10% by weight of one or more first flours, preferably at least 1% by weight. Preferably the composition of the invention comprises from 1 to 8% by weight of one or more first flours, more preferred from 1 to 6% by weight, more preferred from 1 to 5% by weight. Even when used in relatively low concentrations, the first flour of the present invention is capable of substantially improving the stability of the oil-in-water emulsion. Accordingly, the one or more first flours preferably represent not more than 10%, preferably not more than 7%, more preferably not more than 6%, most preferably not more than 5.5% of the oil-in-water emulsion, calculated as dry matter by weight of aqueous phase. Typically, the one or more first flours are employed in a concentration of at least 1%, even more preferably of at least 1.5% and most preferably of at least 2%, calculated as dry matter by weight of the aqueous phase.

Preferably the one or more first flours are native flours, and/or the second flour is a native flour, and/or the third starch is a native starch. These materials preferably have not been chemically or enzymatically modified. Preferably the flours and third starch have not been physically modified before preparing the composition of the invention, meaning that the flours and third starch have not been pre-treated with the purpose to modify its properties, e.g. by heating. When preparing the composition of the invention, the flours and/or third starch are heated such that proteins present may denature, and starch may gelatinise. Preferably the first and second flour have not been dried before being used in the composition of the invention.

In case the first flour comprises flour obtained from pulse seed, it has the following composition, calculated on dry weight of the raw pulse seed:
35 to 60 wt % of starch;
15 to 35 wt % of protein;
0.8-10 wt % of lipids,
1 to 40 wt % of dietary fibre, and
0.5 to 12 wt % of sugars. Preferably, starch, dietary fibre, sugars, protein and lipids together make up 95 to 100 wt % of the dry matter contained in the pulse seed; and preferably the pulse seed contains starch and protein in a weight ratio of 2:3 to 3:1.

Preferably the amount of starch ranges from 40% to 60% based on dry weight of the raw pulse seed; preferably from 40% to 55%.

Preferably the amount of protein ranges from 15% to 30% based on dry weight of the raw pulse seed.

Preferably the amount of lipids ranges from 0.8% to 8% based on dry weight of the raw pulse seed, preferably from 0.8% to 2%.

Preferably the amount of dietary fibre ranges from 10% to 40% based on dry weight of the raw pulse seed, preferably from 10% to 25%, more preferred from 10% to 20%.

The term 'dietary fibre' as used herein refers to indigestible non-starch polysaccharides such as arabinoxylans, cellulose, lignin, pectins and beta-glucans.

The term 'sugars' as used herein refers to mono- and disaccharides.

The contents of 'dietary fibre', 'sugar', 'protein', 'starch', 'fat' mentioned in this invention are determined according to the standards used by the U.S. Department of Agriculture, Agricultural Research Service. 2010. USDA National Nutrient Database for Standard Reference, Release 23.

In case the first flour comprises flour obtained from pulse seed, then it may be obtained from dehulled and/or non-dehulled pulse seed. The water-structuring and emulsifying properties of the finely ground pulse seed are believed to be largely attributable to the starch and protein components. Since the hulls of pulse seed predominantly consist of dietary fibre, dehulling does not significantly affect the functionality of the finely ground seed in the present emulsion. Preferably, if used, then finely ground pulse seed employed is obtained from dehulled pulse seed.

Preferably, in case the first flour comprises pulse seed, then the pulse seed contains starch and protein in a weight ratio of 1:1 to 5:2, most preferably in a weight ratio of 1:1 to 2:1. Preferably the pulse seed contains starch and dietary fibre in a weight ratio of 3:10 to 12:1, more preferred in a weight ratio of 1:2 to 8:1.

Globulins and albumins typically represent a major part of the protein contained in the pulse seed. Accordingly, in a preferred embodiment, globulins and albumins represent at least 50 wt %, more preferably 55 to 95 wt % and most preferably 60 to 90 wt % of the protein contained in the pulse seed.

Emulsions of particular good quality can be obtained if the first flour comprises pulse seed that contains globulins and albumins in a weight ratio that lies within the range of 10:1 to 1:1, or even more preferably in a weight ratio of 7:1 to 2:1. Preferably the globulins legumin and vicilin together represent at least 35 wt %, more preferably 40 to 75 wt % and most preferably 45 to 70 wt % of the protein comprised in the pulse seed. The protein glutelin preferably represents 5 to 30% by weight, more preferably 8 to 25% by weight of the protein comprised in the pulse seed. The content of globulin, albumin, legumin, vicilin, and glutelin in the pulse seeds of the present invention is suitably determined by the method described by Gupta & Dhillon (Annals of Biology, 1993, 9, 71-78).

The protein provided by the finely ground pulse seed preferably comprises not more than a minor amount of sizeable coagulated protein aggregates. Typically, the finely ground pulse seed comprises 0 to 1 wt % of coagulated protein aggregates having a hydrated diameter of at least 1.0 micrometer. The hydrated diameter can suitably be determined by Confocal Scanning Laser Microscopy with Nile Blue as fluorescent dye.

In case the first flour comprises a pulse seed, then the protein is denatured during a heating step. In case the first flour comprises a pulse seed, then the starch from the pulse seed is largely gelatinized during a heating step. Preferably 50 to 100 wt %, more preferably 70 to 100 wt % and most preferably 90 to 100 wt % of the starch contained in the emulsion is gelatinised. Gelatinised starch is believed to enhance the emulsion stability by structuring the continuous aqueous phase of the emulsion. The extent to which the starch present in the emulsion is gelatinised can suitably be determined by cross polarised light microscopy.

In order to prevent protein gelation by divalent metal ions, such as $Ca^{2+}$ and $Mg^{2+}$, preferably the aqueous phase of the present emulsion comprises less than 1.0 mmol per gram of protein, more preferably less than 0.5 mmol per gram of protein of divalent metal cation selected from $Ca^{2+}$, $Mg^{2+}$ and combinations thereof. Preferably the emulsion of the invention is not in the form of a gel.

In case the first flour comprises a finely grinded pulse seed, then preferably the pulse seed is obtained from plants of one or more of the genera *Vigna, Lens*, and *Cicer*. Preferably the pulse seed is obtained from plants of one or more of the species *Vigna radiata* (mungbean), *Lens culinaris* (lentil), and *Cicer arietinum* (chickpea). Most preferred the pulse seed is obtained from plants of the species *Lens culinaris* (lentil).

Although the emulsions of the inventions can be prepared without egg or egg yolk, they may contain egg, egg yolk, or other egg ingredients, as consumers may like the presence of egg yolk, because of the taste. Preparation of the emulsions without egg is possible as the first flour, and/or the second flour, and/or the third starch contain compounds which stabilise and/or emulsify dispersed oil droplets in the continuous aqueous phase. In particular in case the first flour is obtained from pulse seed, then the first flour comprises protein which acts as emulsifier to disperse the oil droplets.

In case the composition comprises a first flour obtained from pulse seed, then preferably the concentration of ingredients originating from egg is maximally 4% by weight, preferably maximally 1% by weight, preferably the composition is free from ingredients originating from egg. Examples of such ingredients may be whole egg, egg yolk, egg white, dried egg yolk, or dried egg white, egg protein, and enzyme modified egg yolk. Preferably, enzyme modified egg yolk has been treated with the enzyme phospholipase A2, in order to split off a fatty acid chain from phospholipid which is present in egg yolk. Ingredients originating from egg may also be called egg solids, meaning dry solids contained in egg derived components.

The compositions of the invention preferably comprise salt, preferably NaCl. Salt may aid the dissolution of proteins from the first flour, leading to better dispersion of the oil. If salt is added then preferably the concentration of salt ranges from 0.1% to 2% by weight of the composition, preferably from 0.5% to 1.8% by weight, preferably from 1% to 1.8% by weight, preferably from 1.2 to 1.8% by weight.

Other first flours may be used as well. Preferably the first flour comprises flour obtained from plants of one or more of the genera *Solanum* and *Manihot*. Preferred species from which the first flour can be obtained are *Solanum tuberosum* (potato), and *Manihot esculenta* (cassava). In case of *Solanum tuberosum*, the first flour preferably is obtained from the tuber, the potato. In case of *Manihot esculenta*, the first flour preferably is also obtained from the tuber, the cassava. These one or more preferred first flours preferably comprise starch at a concentration of at least 60%, more preferred 70%, based on the dry weight of the flour. Preferably the starch of these first flours comprises at least 20% amylose, based on the dry weight of the starch. These first flours preferably comprise maximally 10% protein, based on the dry weight of the flour.

In case the first flour is obtained from potato, or cassava then preferably the first flour has been dried before using in the composition of the invention.

Preferably these one or more first flours obtained from plants of one or more of the genera *Solanum* and *Manihot*, are employed in combination with one or more ingredients originating from egg, preferably with whole egg, egg yolk, egg white, dried egg yolk, or dried egg white, egg protein, and enzyme modified egg yolk. More preferred the composition of the invention comprises in such case egg yolk and/or enzyme modified egg yolk. Preferably in such case the amount of egg yolk and/or enzyme modified egg yolk in the composition ranges from 0.5 to 8% by weight, more preferred from 0.5 to 6% by weight, more preferred from 0.5 to 4% by weight. Preferably, enzyme modified egg yolk has been treated with the enzyme phospholipase A2. In case egg yolk and/or enzyme modified egg yolk is added to the composition, then preferably this is added after the acidification step e) of the method of the invention.

Preferably the composition is free from added isolated emulsifier to stabilise the oil droplets. With isolated emulsifier is meant that an emulsifier is added in isolated form to stabilise the oil droplets. Examples of such added emulsifiers include lecithin, monoglycerides, diglycerides, and polyglycerol esters. Therefore the composition of the invention preferably is free from the emulsifiers lecithin, monoglycerides, diglycerides, and polyglycerol esters. Nevertheless emulsifying compounds may be present as an ingredient of the first flour, and/or the second flour, and/or the third starch, so that effectively the first and/or second flour and/or the third starch stabilise the oil droplets.

The composition of the invention comprises from 0.5 to 10% by weight of a second flour and/or a third starch, preferably at least 1% by weight. Preferably the amylose content of the starch in the second flour is maximally 2% by dry weight of the starch. The starch content of the second flour preferably is at least 70% by weight, more preferred at least 75% by weight, based on the dry weight of the second flour. The second flour is a flour containing starch that can be considered to be a waxy starch, preferably is a waxy starch. The amylose content of the third starch is maximally 5% by weight of the starch, preferably maximally 2% by dry weight of the starch. The third starch can be considered to be a waxy starch, preferably is a waxy starch. Preferably the composition of the invention comprises from 1 to 8% by weight of a second flour and/or a third starch, more preferred from 1 to 6% by weight, more preferred from 1 to 5% by weight. The second flour preferably may comprise fat in an amount of maximally 5%, and protein at an amount of maximally 15%, both based on the dry weight of the second flour.

Preferably the amount of first flour relative to the amount of second flour and/or third starch ranges from 40%:60% by weight to 80%:20% by weight, preferably from 45%:55% by weight to 66.6%:33.3% by weight, preferably from 50%:50% to 60%:40% by weight. This is based on the total amount of flour and/or starches present in the composition.

Both the first and second flours preferably have been finely grinded to provide flours which create a smooth emulsion when used in the composition of the invention. Preferably the particle size of both the first and second flours is less than 120 micrometer, more preferably the average particle size of the flours ranges from 10 to 60 micrometer. Preferably, the flours contain less than 10 wt %, more preferably less than 5 wt % and most preferably less than 1 wt % of particles having a hydrated diameter of 200 micrometer or more. The hydrated diameter of the finely ground flours is suitably determined by means of Confocal Scanning Laser Microscopy, using the fluorescent dye Acridine Orange.

The second flour comprises flour obtained from plants of the genus *Oryza*; preferably from plants of the species *Oryza sativa* (rice). More preferably the second flour comprises flour obtained from plants from the species *Oryza sativa* var. *glutinosa* (glutinous rice). In case of *Oryza sativa*, preferably *Oryza sativa* var. *glutinosa*, the second flour preferably is obtained from the rice grains.

The composition of the invention may contain a third starch, either in combination with the first flour and the second flour, or alone with the first flour. The third starch comprises waxy rice starch. The amylose content of waxy rice starch preferably is maximally 5% by dry weight of the starch, preferably maximally 2% by dry weight of the starch.

One of the advantages of using the combination of a first flour, and a second flour and/or a third starch, is that if amylopectin would be used as the only thickener and stabiliser, that the amount of amylopectin needed would be relatively high, as the viscosity increase of amylopectin per gram is less than that of amylose. Therefore by combining amylopectin and amylose, the total amount of starch can be reduced.

The composition of the present invention can be stabilised very effectively by using a first flour, and a second flour and/or a third starch. Addition of a modified starch prior to preparing the emulsion or after preparing the emulsion is not required. Hence, in a preferred embodiment, the composition contains no modified starch, or only at a low concentration. Preferably the concentration of a modified starch is maximally 0.5% by weight of the product, more preferred maximally 0.1% by weight, and most preferred modified starch is absent from the composition. The term 'modified starch' as used herein refers to an enzymatically or chemically treated starch, with the aim to either attach chemical moieties to the starch molecules, or crosslink molecules, or split the starch molecules into smaller units, or any other chemical modification step. Additionally, other conventional water structuring agents are not required, or only at a low concentration. Preferably the concentration of other added conventional water structuring agents is maximally 0.5% by weight of the product, more preferred maximally 0.1% by weight, and most preferred other added conventional water structuring agents are absent from the composition. Consequently, most preferred the emulsion contains no added water structuring agent selected from modified cellulose, modified starch, xanthan, agar, gelatin, carrageenan (iota, kappa, lambda), gellan, galactomannans (guar, tara, *cassia*, locust bean gum), konjac glucomannan, gum arabic, pectins, alginate and chitosan. Nevertheless the composition of the invention may contain hydrocolloids in case they are an element of the first flour, or the second flour, or the third starch.

The combination of ingredients in the composition of the invention has a very significant effect on the rheological properties of the present emulsion, e.g. in that it provides an elastic modulus G', measured at 20° C., within the range of 100 to 3500 Pa, most preferably in the range of 800 to 2000 Pa.

The viscosity of the present emulsion typically lies in the range of 0.1 to 80 Pa·s, more preferably in the range of 1 to 40 Pa·s at $10 \ s^{-1}$ and 20° C. The viscosity can be determined using an AR 2000 rheometer (ex TA instruments, New Castle, DE, USA), equipped with plate-plate measurement geometry (40 mm diameter, roughened plates, gap size 1000 micrometer).

Preferably the composition has a Stevens value at 20° C. of maximally 300 gram, preferably maximally 200 gram. Preferably the emulsion has a Stevens value at 20° C. of at least 80 gram, preferably at least 100 gram, preferably ranging from 100 to 200 gram. More preferably the emulsion has a Stevens value at 20° C. ranging from 100 to 150 gram. The Stevens value is determined at 20° C. by using a Stevens LFRA Texture Analyser (ex Brookfield Viscometers Ltd., UK) with a maximum load/measuring range of 1000 grams, and applying a penetration test of 25 mm using a grid, at 2 mm per second penetration rate, in a cup having a diameter of 65 mm, that contains the emulsion; wherein the grid comprises square openings of approximately 3×3 mm, is made up of wire with a thickness of approximately 1 mm, and has a diameter of 40 mm. Preferably the grid comprises square openings of 3×3 mm, is made up of wire with a thickness of 1 mm, and has a diameter of 40 mm. This methodology is further described in the experimental section.

The edible emulsion may suitably contain one or more additional ingredients besides water, oil, acid, first flour, and second flour and/or third starch, and ingredients that have been mentioned herein before. Examples of such optional ingredients include spices, vitamins, flavouring, colouring, preservatives, antioxidants, chelators, herbs and pieces of meat, vegetable or cheese. Such optional additives, when used, collectively, do not make up more than 40%, more preferably not more than 20% by weight of the composition.

Method for Preparation of the Composition of the Invention

In a second aspect the invention provides a method for preparation of a composition according to the first aspect of the invention, comprising the steps:

a) mixing water and one or more first flours,
  wherein the first flour comprises flour obtained from pulse seed having the following composition, calculated on dry weight of the raw pulse seed:
    35 to 60 wt % of starch;
    15 to 35 wt % of protein;
    0.8-10 wt % of lipids,
    1 to 40 wt % of dietary fibre, and
    0.5 to 12 wt % of sugars;
  or wherein the first flour comprises flour obtained from plants of one or more of the genera *Solanum* and *Manihot*; and
  a second flour comprising flour obtained from plants of the genus *Oryza*, and/or a third starch comprising waxy rice starch at a temperature below 60° C.;

b) heating the mixture from step a) from a temperature below 60° C. to a temperature ranging from 75 to 95° C., and keeping the mixture at that temperature during a time period of at least 2 minutes;

c) adding oil to the mixture from step b) and dispersing the oil in the mixture, preferably using a high shear mixer;

d) optionally homogenising the mixture of step c) to create an oil-in-water emulsion wherein the oil droplets have a volume weighted mean droplet size D3,3 of less than 15 micrometer; and e) adding a food-grade acid to the mixture of step d), to a pH ranging from 3 to 5.

In step a) an aqueous dispersion is made of the first flour, the second flour and/or the third starch. Preferably the one or more first flours are native flours, and/or the second flour is a native flour, and/or the third starch is a native starch. The flours and starch are below the gelatinization temperature of the starches, and below the denaturation temperatures of the proteins. Preferably a homogeneous dispersion is prepared in step a). Preferably in step a) the temperature is below 65° C. The mixing of the flours, starch and water may be done at room temperature, and subsequently the temperature may be increased while agitating. This step is performed at the natural pH of the dispersion, no compounds need to be added in order to adjust the pH of the dispersion. Typically the pH will be at about 6.5 in this step.

In step b) the dispersion is heated to a temperature above the gelatinisation temperature of the starches. This leads to the formation of a thickened aqueous dispersion. Preferably the mixture is agitated in step b) to prevent settling of starch granules. Preferably this agitation is under low shear. The temperature of the mixture as obtained from step a) is increased from a temperature below 60° C. to a temperature ranging from 75° C. to 95° C., preferably ranging from 85° C. to 95° C. Preferably the temperature of the mixture as obtained from step a) is increased from a temperature below 65° C. to a temperature ranging from 75° C. to 95° C., preferably ranging from 85° C. to 95° C.

Preferably in step b) the mixture is kept at a temperature ranging from 75 to 95° C. during at least 3 minutes, preferably at least 5 minutes, and preferably maximally 80 minutes, preferably maximally 70 minutes, preferably maximally 60 minutes.

During this step the waxy starch in the second flour (which is mainly amylopectin) and/or from the third starch gelatinises first and creates a continuous matrix of gelatinised amylopectin. The starch granules originating from the first flour gelatinise at a higher temperature. After the temperature has been increased further, the amylose containing starch granules start to gelatinise. As the amylose containing starch granules are present in a continuous matrix of gelatinised amylopectin, the amylose is not released into the continuous amylose phase, but will remain to be mainly localised in amylose-rich inclusions. Without being bound by theory, the inventors believe that this structure leads to a strongly reduced retrogradation of the starches, in particular of the amylose in the inclusions. No retrogradation of amylose will occur in the continuous phase, consequently the physical structure of the composition of the invention is stable, and the emulsion does not suffer from syneresis during storage.

Moreover, this structure also leads to less sticky mouthfeel of the emulsion. A waxy starch phase which is fully gelatinised cannot easily be broken due to shear. The inclusion of amylose-rich patches in the continuous phase of amylopectin, makes the composite structure (amylopectin with amylose-rich inclusions) more sensitive to shear, and consequently easier to break under the influence of shear. Therewith the combination of flours and/or starches of the invention leads to a non-sticky emulsion in the mouth.

Preferably in step b) the mixture from step a) is at a temperature ranging from 60° C. to 70° C. during a time period of at least 10 seconds, and subsequently at a temperature between 70° C. and 95° C. during a time period of at least 10 seconds. Preferably in step b) the mixture from step a) is at a temperature ranging from 60° C. to 70° C. during a time period of at least 30 seconds, preferably at least 1 minute, and subsequently at a temperature between 70° C. and 95° C. during a time period of at least 30 seconds, preferably at least 1 minute. Preferably in step b) the mixture from step a) is at a temperature ranging from 65° C. to 70° C. during a time period of at least 30 seconds, more preferred at a temperature ranging from 65° C. to 70° C. during a time period of at least 1 minute.

Preferably after step b), at least 20%, preferably at least 30%, of the starch from the first flour will be present in the form of partly or fully gelatinised starch granules, having an average size (D4,3) of at least 30 micrometer, preferably at least 40 micrometer.

After step b) the mixture may be cooled before oil is added in step c). Preferably the mixture from step b) is cooled to a temperature lower than 50° C., preferably lower than 40° C., and preferably to a temperature of more than 25° C., and preferably more than 30° C. Preferably, in this step c) salt (preferably NaCl) is added. The salt may aid the dissolution of proteins from the first flour, leading to better dispersion of the oil.

Subsequently in step c) oil is added to the mixture and the oil is mixed into the aqueous dispersion. Preferably this is done using a high shear mixer, in order to create small oil droplets, and disperse them evenly in the aqueous phase. This step is done at the natural pH of the dispersion, the dispersion has not been acidified by the addition of an acidulant. Other ingredients of the composition than the acidulant are optionally added to the aqueous dispersion. In case the first flour comprises flour obtained from plants of one or more of the genera *Solanum, Manihot*, and *Zea*, then preferably ingredients originating from egg, preferably egg yolk and/or enzyme modified egg yolk are added to the composition in step c). In such case preferably the mixture from step b) is cooled before the ingredients originating from egg are added.

Optionally in step d) the dispersion obtained in step c) is further homogenised to create a fine dispersion of oil droplets. The optional homogenisation in step d) is done during a time period long enough that the dispersed oil phase typically has a volume weighted geometric mean diameter D3,3 of less than 15 micrometer, preferably less than 10 micrometer, preferably from 0.3 to 10 micrometer, preferably from 0.5 to 8 micrometer. Preferably the oil droplets of the emulsion obtained in step d) have a volume weighted geometric mean droplet size D3,3 of less than 6 micrometer. This mean diameter may suitably be determined using the method described by Goudappel et al. (Journal of Colloid and Interface Science 239, p. 535-542, 2001). Typically, 80 to 100% of the total volume of the oil droplets contained in the present emulsion have a diameter of less than 15 micrometer, more preferably a diameter ranging from 0.5 to 10 micrometer. The homogenisation may be done using a conventional mixer for preparing oil-in-water emulsions, such as a colloid mill, or another mill as described in WO 02/069737 A2. A suitable supplier of such emulsification equipment is Charles Ross & Son Company, (Hauppauge, New York, USA).

In step e) the acidulant is added to the aqueous mixture obtained in step c) or d), and the mixture is acidified to a pH between 3 and 5. This leads to a thickening of the aqueous phase and stabilisation of the emulsion obtained in step c) or d).

In case no egg components have been added to the composition in step c), then these compounds may still be added to the composition after the acidification step e). Preferably these optional egg components comprise egg yolk, and/or enzyme modified egg yolk, preferably egg yolk which has been treated with phospholipase, preferably phospholipase A2. In case the composition comprises a first flour obtained from pulse seed, and in case these compositions contain egg components, then preferably these are added after the acidification step e).

Use of First Flour, Second Flour, Third Starch

In a third aspect the invention provides use of one or more first flours, wherein the first flour comprises:
- starch at a concentration of at least 35% based on the dry weight of the first flour, wherein the amylose content of the starch ranges from 15% to 60% by dry weight of the starch;
- protein at a concentration of maximally 35% based on the dry weight of the first flour;
- lipids at a concentration of maximally 10% based on the dry weight of the first flour; and wherein the first flour comprises flour obtained from pulse seed having the following composition, calculated on dry weight of the raw pulse seed:
- 35 to 60 wt % of starch;
- 15 to 35 wt % of protein;
- 0.8-10 wt % of lipids,
- 1 to 40 wt % of dietary fibre, and
- 0.5 to 12 wt % of sugars;

or wherein the first flour comprises flour obtained from plants of one or more of the genera *Solanum* and *Manihot*; and a second flour comprising flour obtained from plants of the genus *Oryza*, and/or a third starch comprising waxy rice starch, wherein the second flour comprises starch at a concentration of at least 60% based on the dry weight of the second flour, wherein the amylose content of the starch in the second flour is maximally 5% by dry weight of the starch, and wherein the amylose content of the third starch is maximally 5% by weight of the starch; to reduce syneresis in an oil-in-water emulsion.

Preferably the concentration of the one or more first flours in the emulsion ranges from 0.5 to 10% by weight, preferably from 1 to 8% by weight. Preferably the concentration of the second flour and/or the third starch in the emulsion ranges from 0.5 to 10% by weight, preferably from 1 to 8% by weight. Preferably the one or more first flours are native flours, and/or the second flour is a native flour, and/or the third starch is a native starch.

Alternatively, in a third aspect the invention provides use of one or more first flours, wherein the first flour comprises:
- starch at a concentration of at least 35% based on the dry weight of the first flour, wherein the amylose content of the starch ranges from 15% to 60% by dry weight of the starch;
- protein at a concentration of maximally 35% based on the dry weight of the first flour;
- lipids at a concentration of maximally 10% based on the dry weight of the first flour; and wherein the first flour comprises flour obtained from pulse seed having the following composition, calculated on dry weight of the raw pulse seed:
- 35 to 60 wt % of starch;
- 15 to 35 wt % of protein;
- 0.8-10 wt % of lipids,
- 1 to 40 wt % of dietary fibre, and
- 0.5 to 12 wt % of sugars;

or wherein the first flour comprises flour obtained from plants of one or more of the genera *Solanum* and *Manihot*; and a second flour comprising flour obtained from plants of the genus *Oryza*, and/or a third starch comprising waxy rice starch, wherein the second flour comprises starch at a concentration of at least 60% based on the dry weight of the second flour, wherein the amylose content of the starch in the second flour is maximally 5% by dry weight of the starch, and wherein the amylose content of the third starch is maximally 5% by weight of the starch; to control breakdown of an oil-in-water emulsion in the mouth.

Preferably the concentration of the one or more first flours in the emulsion ranges from 0.5 to 10% by weight, preferably from 1 to 8% by weight. Preferably the concentration of the second flour and/or the third starch in the emulsion ranges from 0.5 to 10% by weight, preferably from 1 to 8% by weight. Preferably the one or more first flours are native flours, and/or the second flour is a native flour, and/or the third starch is a native starch.

Preferred aspects indicated in the context of the first or second or third aspect of the invention are applicable to the other aspects of the invention, mutatis mutandis.

EXAMPLES

The following non-limiting examples illustrate the present invention.

Raw Materials

Lentil flour: Red Lentil flour, ex AS Besin, Turkey
Mung bean flour: Cock Brand green mung beans, ex Thai world import & export Co. Ltd. (Thailand); imported by Sin Wah Foods by, Eindhoven, Netherlands
Potato flour: ex Kupiec, Poland
Cassava flour: ex Praise Products, Ghana
Corn flour: Yellow corn flour, ex Molino Comirato, Italy
Waxy rice flour: Glutinous rice flour, product of Thailand, distributed by Erawan Marketing Co, Inc. Bangkok, imported by Kai Tak BV (Rosmalen, Netherlands)
Waxy rice starch: Remyline XS, ex Beneo, Belgium
Waxy corn starch: Merizet 300, ex Tate & Lyle-
Sunflower oil: Winterized, fully refined, ex Unilever Rotterdam, Netherlands
Stabilised egg yolk: Egg yolk, 92-8, free range, heat stabilised, ex Bouwhuis Enthoven, Netherlands
Salt: Suprasel fine salt, ex AkzoNobel
Sucrose: Sugar crystal white, Ex Brenntag suiker unie
Vinegar: 12% acetic acid, spirit vinegar, ex Carl Kühne
Water: Demineralised water
EDTA: EDTA Dissolvine, ex Akzo Nobel
Mustard oil flavour: Mustard flavouring, 1.6%, ex Symrise
Lemon juice concentrate: 45 brix, ex Doehler GmbH

Methods

Figure 1:
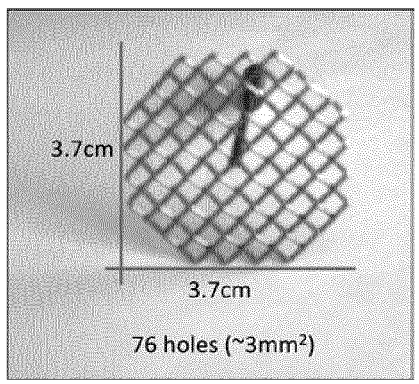
FIG. 1: Picture of grid used for determining the Stevens value of oil-in-water emulsions as used herein.

Firmness/Hardness—Stevens Value: the Stevens value is determined at 20° C. by using a Stevens LFRA Texture Analyser (ex Brookfield Viscometers Ltd., UK) with a maximum load/measuring range of 1000 grams, and applying a penetration test of 25 mm using a grid, at 2 mm per second penetration rate, in a cup having a diameter of 65 mm, that contains the emulsion; wherein the grid comprises square openings of approximately 3×3 mm, is made up of wire with a thickness of approximately 1 mm, and has a diameter of 40 mm. One end of a shaft is connected to the probe of the texture analyser, while the other end is connected to the middle of the grid. The grid is positioned on the flat upper surface of the emulsion in the cup. Upon starting the penetration test, the grid is slowly pushed downward into the emulsion by the texture analyser. The final force exerted on the probe is recorded and translated into the Stevens value in gram. A photograph of the grid is given in FIG. 1. The grid is made from stainless steel, and has 76 holes, each hole having a surface area of approximately 3×3 mm.

Syneresis: Syneresis in an oil-in-water emulsion is the expelling of aqueous liquid, which separates from the product during storage after disrupting the structure by e.g. spooning. In this test gravimetric drip of expelled water from an oil-in-water emulsion into an acrylic cylinder is determined during a storage period at various climate conditions.

Materials: Acrylic cylinder (length 45 mm, inner diameter 21 mm, wall thickness 2 mm, open at two ends) and qualitative filter paper, type 415, diameter 75 mm (ex VWR, Amsterdam, Netherlands). The filter is applied at one end of the cylinder and attached to the outside cylinder wall by adhesive tape. The tube with filter is vertically inserted into an emulsion sample of 225 mL in a jar, until the top of the cylinder is at level with the emulsion surface. The jar is closed with a lid, and stored at 5° C. or 20° C. The amount of liquid in the tube after storage is determined by taking out the liquid from the tube (which has passed through the filter into the tube) with a pipette, and weighing the amount of liquid (in gram) after a determined amount of time. The lower the syneresis value, the better for the stability of the emulsion. Usually measurements are done in duplicate. After measurement, the liquid is returned to the tube when using the same sample for the entire storage trial.

Example 1: Gelatinisation Temperatures of Flours

Gelatinisation temperatures were determined, using a rapid visco analyser (RVA, Newport Scientific Rapid Visco Analyzer). Procedure: 30 gram of a 10% flour (or starch) dispersion is transferred to the measuring cup of the RVA analyzer. The measuring cup is preheated to 50° C. and the dispersion is allowed to equilibrate at this temperature. After equilibration temperature is raised from 50° C. to 90° C. in 6 minutes while stirring with a paddle (stirrer speed 160 rpm); viscosity is measured by recording the resistance of the flour (or starch) dispersion to the stirring action of the paddle.

TABLE 1

Gelatinisation temperatures of flours and starches.

| | Onset temperature of rapid viscosity increase [° C.] |
|---|---|
| Red lentil flour | 73 |
| Mung bean flour | 78 |
| Waxy rice flour | 67 |

TABLE 1-continued

Gelatinisation temperatures of flours and starches.

| | Onset temperature of rapid viscosity increase [° C.] |
|---|---|
| Corn flour | 74 |
| Cassava flour | 72 |
| Potato flour | 65 |
| Waxy rice starch | 70 |
| Waxy corn starch | 71 |

The effect of the heating rate in a RVA was investigated by measuring the maximum viscosity of a mixture of lentil flour and waxy rice flour, see Table 2.

TABLE 2

Maximum viscosity of mixture of lentil flour and waxy rice flour as function of heating rate.

| Heating rate (° C./min) | RVA Peak viscosity (mPa · s) |
|---|---|
| 2 | 492 |
| 3.3 | 717 |
| 4.4 | 788 |
| 6.7 | 1169 |
| 10 | 1228 |
| 16 | 1388 |

Procedure: A sample was equilibrated at 50° C. and then heated at different rates from 50 to 90° C. and kept at 90° C. for 20 minutes. Sample composition: 5.38% lentil flour+5.0% waxy rice flour in water. The lower viscosity obtained at low heating rates is explained from enzyme (amylase) activity of the waxy rice flour (enzyme activity has been confirmed with enzyme activity assays), leading to breakdown of amylose and amylopectin. In case of faster heating, the enzyme is deactivated, and consequently the maximum viscosity is higher. The heating rate does not affect the microstructure: in all cases lentil starch ghosts (structures remaining after gelatinisation) are observed dispersed in a continuous amylopectin phase.

Figure 2:
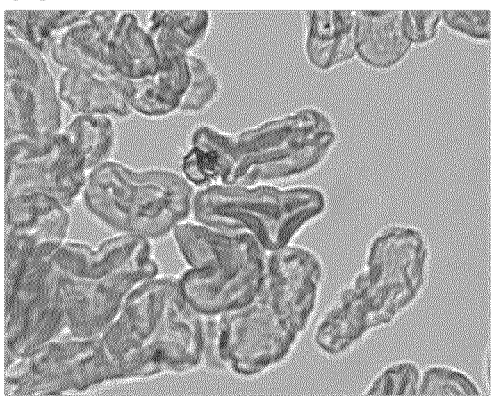
FIG. 2: Visible light microscopy pictures of gelatinised mixtures of lentil starch and waxy rice starch (without oil). Width of the images: 275 micrometer.
- A: 100% lentil starch
- B: 80% lentil starch-20% waxy rice starch
- C: 50% lentil starch-50% waxy rice starch
- D: 20% lentil starch-80% waxy rice starch
Figure 2:
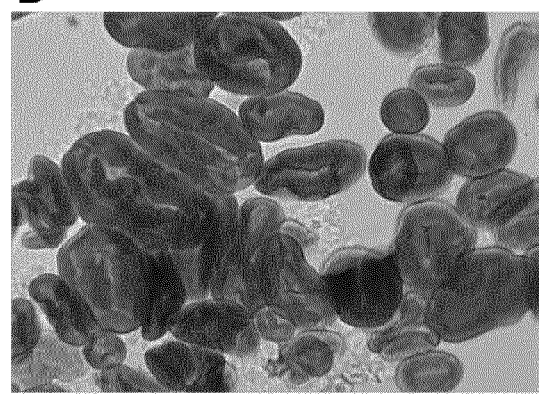
Figure 2:
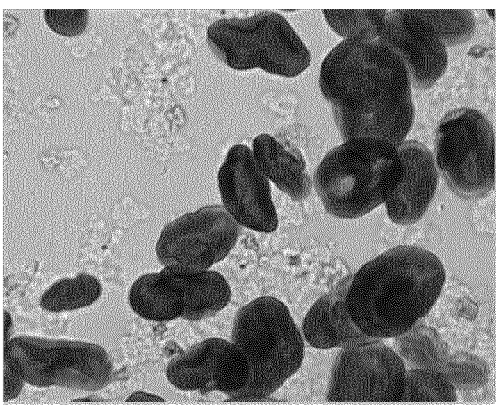
Figure 2:
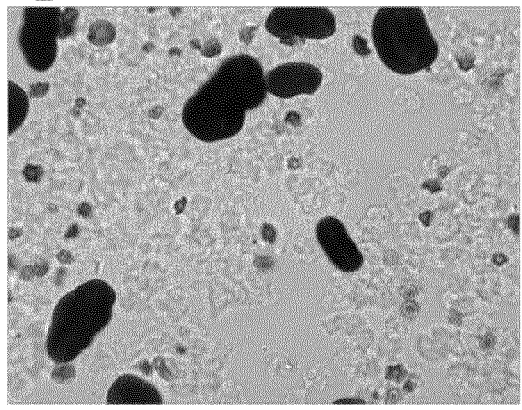

FIG. 2 shows light microscopic pictures of the microstructure of mixtures of lentil starch and waxy rice starch in water (without oil). These have been heated up to 90° C., and starch has been coloured with iodine (Ludol's reagent), and is this is shown in the pictures. To show effects, pure starches have been used. Lentil starch was isolated in house from lentil flour. Total starch content in the samples was 2% by weight.

A: Shows a sample with lentil starch only. The granules are swollen, but not fully dissolved during the heating. Contours are still visible, known as 'ghosts'. The colour is not very intense, which can be interpreted as that amylose from the granules has leaked into the continuous phase.

B: Lentil starch granules are still swollen, and have a more intense colour. This can be interpreted as that only a small amount of amylose from the granules has leaked into the continuous phase.

C: Lentil starch granules are less swollen than in A and B, and have an intense colour. This can be interpreted as that only a very small amount of amylose from the granules has leaked into the continuous phase. Small granules from waxy rice starch are also visible, amylopectin is not visible, and forms the continuous phase.

D: As C, where the starch granules are least swollen and darkest in colour, showing the lentil starch granules in the continuous amylopectin matrix.

These pictures show that the presence of the continuous amylopectin phase from the waxy rice starch (second flour or third starch), which gelatinises first upon increase of temperature, prevents swelling of amylose from lentil starch and leaking to outside the granules.

Example 2: Emulsions Containing 40% or 50% Oil

Oil-in-water emulsions were prepared having the composition as in Table 3 were prepared.

TABLE 3

Composition of emulsions containing 50% oil.

| | concentration [wt %] | | | | | | |
|---|---|---|---|---|---|---|---|
| Ingredient | 2 comp. | 3 | 4 comp. | 5 | 6 comp. | 7 | 12 |
| First flour | | | | | | | |
| Lentil flour | | | | | | | |
| Mung bean flour | | | | | | | |
| Potato flour | 2.9 | 2.9 | | | | | |
| Cassava flour | | | 2.9 | 2.9 | | | |
| Corn flour | | | | | 2.9 | 2.9 | 2.9 |
| Second flour | | | | | | | |
| Waxy rice flour | | 2.5 | | 2.5 | | 2.5 | |
| Third starch | | | | | | | |
| Waxy rice starch | | | | | | | |
| Waxy corn starch | | | | | | | 2.5 |
| Other ingredients | | | | | | | |
| sunflower oil | 50 | 50 | 50 | 50 | 50 | 50 | 50 |
| stabilised egg yolk | 3.3 | 3.3 | 3.3 | 3.3 | 3.3 | 3.3 | 3.3 |
| salt | 0.75 | 0.75 | 0.75 | 0.75 | 0.75 | 0.75 | 0.75 |
| sucrose | 2.1 | 2.1 | 2.1 | 2.1 | 2.1 | 2.1 | 2.1 |
| vinegar (to pH 3.7) | ~1.0 | ~1.0 | ~1.0 | ~1.0 | ~1.0 | ~1.0 | ~1.0 |
| water | to 100% | to 100% | to 100% | to 100% | to 100% | to 100% | to 100% |

The following process was used to prepare these emulsions. The first flour and second flour or third starch were added to cold water under stirring with IKA RW16 basic overhead stirrer. This mixture was heated to 90° C. while stirring, using a water bath to avoid cook-on to the base, and kept at 90° C. for 30 minutes. Water that had been evaporated was added again to the mixture. The slurry was cooled to 30 to 40° C., and sugar, salt and stabilised egg yolk were added, while stirring at 1000 rpm for 30 seconds. Oil was added slowly while stirring (Silverson L4RT high shear mixer with emulsor screen), at about 3000 rpm during 3 minutes, followed by 7000 rpm for 4 minutes. Subsequently vinegar was added while stirring at 400 rpm during 1 minute.

Finally the pH was adjusted to 3.7. This process was used for making about 300-600 g of each of the emulsions.

Also compositions containing 40% oil were prepared, as in Table 4.

TABLE 4

Composition of emulsions containing 40% oil.

| | concentration [wt %] | | | | | |
|---|---|---|---|---|---|---|
| Ingredient | 0 comp. | 1 | 8 | 9 | 10 | 13 comp. |
| First flour | | | | | | |
| Lentil flour | 3.5 | 3.5 | 3.5 | 3.5 | | |
| Mung bean flour | | | | | 3.5 | 3.5 |
| Potato flour | | | | | | |
| Cassava flour | | | | | | |
| Corn flour | | | | | | |
| Second flour | | | | | | |
| Waxy rice flour | | 3.0 | | | 3.0 | |
| Third starch | | | | | | |
| Waxy rice starch | | | 3.0 | | | |
| Waxy corn starch | | | | 3.0 | | |
| Other ingredients | | | | | | |
| sunflower oil | 40 | 40 | 40 | 40 | 40 | 40 |
| stabilised egg yolk | 2.3 | 2.3 | 2.3 | 2.3 | 2.3 | 2.3 |
| salt | 0.9 | 0.9 | 0.9 | 0.9 | 0.9 | 0.9 |
| sucrose | 2.6 | 2.6 | 2.6 | 2.6 | 2.6 | 2.6 |
| vinegar (to pH 3.7) | ~1.2 | ~1.2 | ~1.2 | ~1.2 | ~1.2 | ~1.2 |
| water | to 100% | to 100% | to 100% | to 100% | to 100% | to 100% |

The process to prepare these emulsions was similar as described for the samples in Table 3, with the only difference that the stabilised egg yolk was added after the mixture had been homogenised at 7000 rpm using the Silverson mixer, and after acid addition. The stabilised egg yolk was added after homogenisation and acidification, while stirring at 400 rpm during 1 minute.

The syneresis of these samples was followed in time. After preparation the samples were stored at 5° C. Also the Stevens value was determined, after 12 or 13 days storage at 5° C. The measurement was done at 20° C. The results are given in Table 5 and Table 6. Please note that these two tables contain data both of 40% and 50% oil emulsions.

TABLE 5

Syneresis value as function of time of samples in Table 3 and Table 4.

| | Syneresis [g] after xx days | | | | | | | | |
|---|---|---|---|---|---|---|---|---|---|
| Sample | 3 | 4 | 7 | 11 | 14 | 20 | 23 | 24 | 27 |
| 0 compar. | | | 4.8 | | 6.5 | | | | 7.8 |
| 1 | | 0 | | 0 | | | 0 | | 0 |
| 2 compar. | | 0 | | 0.09 | | | 0.24 | | 0.46 |
| 3 | | 0 | | 0 | | | 0 | | 0 |
| 4 compar. | 0.37 | | 0.83 | | | 1.63 | | 2.11 | |

TABLE 5-continued

Syneresis value as function of time of samples in Table 3 and Table 4.

| Sample | Syneresis [g] after xx days | | | | | | | | |
|---|---|---|---|---|---|---|---|---|---|
| | 3 | 4 | 7 | 11 | 14 | 20 | 23 | 24 | 27 |
| 5 | 0 | | 0 | | | 0 | | 0 | |
| 6 compar. | | 0.77 | | 1.86 | | | 3.97 | | 4.62 |
| 7 | | 0 | | 0 | | | 0 | | 0 |
| 8 | | 0 | | 0 | | | 0 | | 0 |
| 9 | | 0 | | 0 | | | 0 | | 0 |
| 10 | | 0 | | 0 | | | 0 | | 0 |
| 12 | | 0 | | 0 | | | 0 | | 0 |
| 13 compar. | | 1.26 | | 2.87 | | | 5.76 | | 6.68 |

TABLE 6

Stevens value as function of time of samples in Table 3 and Table 4.

| Sample | Stevens values [g] | |
|---|---|---|
| | 2 weeks | 4 weeks |
| 0 compar. | 96 | |
| 1 | 89 | 133 |
| 2 compar. | 68 | 68 |
| 3 | 157 | 172 |
| 4 compar. | 45 | 46 |
| 5 | 129 | 127 |
| 6 compar. | 45 | 48 |
| 7 | 135 | 134 |
| 8 | 167 | 212 |
| 9 | 52 | 122 |
| 10 | 53 | 76 |
| 12 | 156 | 156 |
| 13 compar. | 33 | 48 |

This shows that the emulsions according to the invention, that contain a second flour or a third starch, do not show any syneresis. The type of flour and starch strongly influences the Stevens value. Post-firming was stronger for the emulsions containing lentil flour or mung bean flour.

Example 3: Emulsions Containing 40% Oil

Various emulsions were prepared, containing 40% oil and various combinations of lentil flour and waxy rice flour. The preparation method was similar as for the samples in example 2, Table 4.

TABLE 7

Composition of emulsions with 40% oil.

| Ingredient | concentration [wt %] |
|---|---|
| lentil flour | 3.0 to 3.5 |
| waxy rice flour | 0 to 3.0 |
| sunflower oil | 40 |
| stabilised egg yolk | 2.3 |
| salt | 0.9 |
| sucrose | 2.6 |
| vinegar | to pH 3.7 |
| tap water | to 100% |

The syneresis of these samples was followed in time. After preparation the samples were stored at 5° C. Results are given in the following table.

TABLE 8

Syneresis of samples from Table 7, with various concentrations of lentil flour and waxy rice flour (in wt %).

| | Syneresis [g] after storage for xx weeks | | | |
|---|---|---|---|---|
| | 1 | 2 | 4 | 6 |
| 3.0 lentil:0 rice | 5.4 | 7.4 | 8.5 | 8.9 |
| 3.0 lentil:1.0 rice | 0.5 | 1.0 | 2.5 | 3.3 |
| 3.0 lentil:2.0 rice | 0 | 0.08 | 0.4 | 0.7 |
| 3.0 lentil:3.0 rice | 0 | 0 | 0.03 | 0.08 |
| 3.5 lentil:0 rice | 4.1 | 5.8 | 7.3 | 7.4 |
| 3.5 lentil:1.0 rice | 0.3 | 0.6 | 1.7 | 2.5 |
| 3.5 lentil:2.0 rice | 0 | 0.04 | 0.3 | 0.6 |
| 3.5 lentil:3.0 rice | 0 | 0 | 0.07 | 0.2 |

These results show that once lentil flour is combined with waxy rice flour, that the syneresis is strongly reduced.

Example 4: Emulsions without Egg Yolk

Various emulsions were prepared which did not contain egg yolk.

TABLE 9

Composition of emulsions containing about 40-50% oil.

| Ingredient | concentration [wt %] | | | | |
|---|---|---|---|---|---|
| | 4-0 | 4-1 | 4-2 | 4-3 | 4-4 |
| water | to 100% | to 100% | to 100% | to 100% | to 100% |
| lentil flour | 3 | 3.5 | 3.5 | 2.9 | 2 |
| waxy rice flour | | 3 | 3 | | |
| waxy corn starch | | | | 2.5 | |
| potato flour | | | | | 2.9 |
| sugar | 2 | 2.6 | 2.6 | 2.6 | 2.6 |
| NaCl | 1.4 | 0.9 | 0.9 | 0.9 | 0.9 |
| EDTA | | 0.01 | 0.01 | 0.01 | 0.01 |
| sunflower oil | 50 | 39.5 | 39.5 | 49.5 | 49.5 |
| mustard flavour (1.6%) | | 0.3 | 0.3 | 0.3 | 0.3 |
| vinegar (to pH 3.7) | ~3 | ~3 | ~3 | ~2 | ~2 |
| lemon juice conc. | | 0.2 | 0.2 | 0.2 | 0.2 |
| stabilised egg yolk | | 2.3 | | | |

These emulsions were prepared by the similar process as for the samples in example 2 Table 3. The exception is that sample 4-5 was prepared at 2000 rpm.

TABLE 10

Syneresis and Stevens value as function of time of samples in Table 9.

| Sample | Syneresis [g] after xx days | | | | | | Stevens value [g] after xx days | | | | |
|---|---|---|---|---|---|---|---|---|---|---|---|
| | 0 | 9 | 15 | 22 | 43 | 63 | 2 | 14 | 16 | 25 | 27 |
| 4-0 | 0 | 0.3 | 0.64 | 1.1 | | 2.4 | | | | | |
| 4-1 | 0 | 0 | 0 | 0 | 0 | | 42 | 64 | | | 11 |
| 4-2 | 0 | 0 | | | | 0.1 | | | 130 | 145 | |
| 4-3 | 0 | 0 | | | | 0 | | | 180 | 205 | |
| 4-4 | 0 | 0 | | | | 0.9 | | | 300 | 345 | |

These results show that the samples with lentil flour and waxy flours have very low syneresis. The sample with only lentil flour shows significant syneresis. A value of lower than 1 gram is a measure for a physically stable product.

Example 5: Emulsions in Sensory Panel Test and in Flow Measurements

A sensory evaluation was performed of four emulsions containing various combinations of flours. The composition of the samples is given in Table 11, prepared in a similar way as the samples in example 2, Table 4. The emulsions were stored for 2 weeks at 5° C., before being presented to the sensory panel.

TABLE 11

Composition of emulsions used for sensory evaluation.

| | concentration [wt %] | | | |
|---|---|---|---|---|
| Ingredient | 5-1 057 | 5-2 295 | 5-3 836 | 5-4 142 |
| water | to 100% | to 100% | to 100% | to 100% |
| lentil flour | 3.5 | | | 3.5 |
| waxy rice flour | 3 | 5 | 9 | |
| sucrose | 2.6 | 2.6 | 2.6 | 2.6 |
| NaCl | 0.9 | 0.9 | 0.9 | 0.9 |
| Sunflower oil | 40 | 40 | 40 | 49.5 |
| vinegar (to pH 3.7) | ~1 | ~3 | ~3 | ~2 |
| stabilised egg yolk | 2.3 | 4 | 4 | 2.3 |

The sensory panel consisted of 12 people, who were not particularly trained and who tasted the products without knowledge about the composition of the products. The panel members were asked to give an objective description of the emulsion they were tasting, on the aspects of appearance, odour, mouthfeel, taste, and aftertaste.

In general emulsions 5-2 and 5-3 containing only waxy rice flour, were evaluated to be most sticky and dispersed slowest in the mouth. In spite of amylase acting on the many branches of amylopectin in waxy starch, the gelatinisation of the amylopectin in the waxy rice flour turned out to be limiting a fast dispersion of the emulsion in the mouth. Emulsions 5-1 (combination of flours) and 5-4 (lentil flour only) appeared to be less sticky and dispersed more easily in the mouth. The emulsion with the combination of a first (lentil) and a second (waxy rice) flour indeed was regarded to be of better quality than the emulsions that did not have a combination of a first flour and a second flour.

Figure 3:
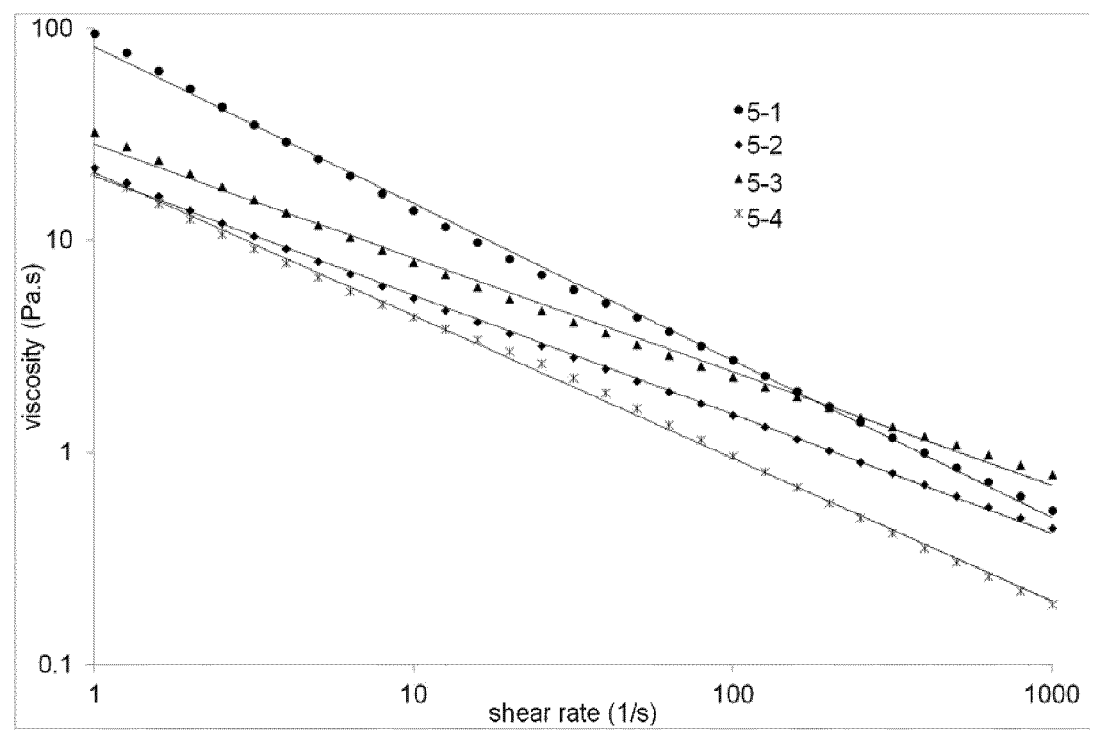
FIG. 3: Graph showing viscosity as function of shear rate, from example 5. Legend: ● 5-1; ♦ 5-2; ▲ 5-3; ✱ 5-4

These same emulsions were also subjected to flow measurements, to determine the viscosity of the emulsions as function of the shear rate. These measurements were performed using an AR 2000 rheometer (TA instruments, New Castle, DE, USA), equipped with plate-plate measurement geometry (40 mm diameter, roughened plates, gap size 1000 micrometer). Shear rate was increased from 1 to 1000 s$^{-1}$ in 5 minutes; measurement temperature was 20° C. The results for the emulsions are shown in FIG. 3 (both the measurements as well as a trendline are shown). The results indicate that viscosity decreases with shear rate according to a power law: viscosity ~(shear rate)$^{-p}$. viscosity decreases faster for samples 5-1 (●) and 5-4 (✸) than for samples 5-2 (♦) and 5-3 (▲); this is reflected by higher power law indices: p=0.74 and 0.67 for samples 5-1 and 5-4 versus p=0.56 and 0.53 for samples 5-2 and 5-3. The results thus indicate that the samples containing lentil flour alone or in combination with waxy rice flour break down under shear in different ways. This coincides with the results of the sensory evaluation: viscosity of samples 5-1 and 5-4 breaks down more easily and this may contribute to better dispersibility of these products in the mouth (in line with results of sensory evaluation). Products 5-2 and 5-3 (structured with waxy starches only) are less shear thinning and may therefore be perceived as less dispersible and more sticky.

These results show that the combination of a first flour and a second flour lead to faster breakdown of the emulsion, as perceived by a sensory panel, and confirmed by flow measurements. Therewith an emulsion containing the combination of flours will more rapidly breakdown in the mouth upon ingestion. This means that these products will be less sticky in the mouth, in spite of the presence of waxy starch. A first flour, a second flour and/or a third starch according to the invention can be used to reduce syneresis in an oil-in-water emulsion, and to control breakdown of an oil-in-water emulsion in the mouth.

The invention claimed is:

1. A method for preparation of a composition in the form of an oil-in-water emulsion having a pH ranging from 3 to 5, the composition comprising:
   (i) from 10% to 70% by weight of oil;
   (ii) from 0.1% to 10% by weight of acid;
   (iii) from 0.5% to 10% by weight of one or more first flours, wherein the first flour comprises:
      starch at a concentration of at least 35% based in the dry weight of the first flour, wherein the amylose content of the starch ranges from 15% to 60% by dry weight of the starch;
      protein at a concentration of maximally 35% based on dry weight of the first flour; and
      wherein the first flour comprises flour obtained from pulse seed having the following composition, calculated on dry weight of the raw pulse seed:
      35 to 60 wt % of starch;
      15 to 35 wt % of protein;
      0.8-10 wt % of lipids,
      1 to 40 wt % of dietary fiber, and
      0.5 to 12 wt % of sugars;
      or wherein the first flour comprises flour obtained from plants of one or more of the genera *Solanum* and *Manihot*, and
   (iv) from 0.5 to 10% by weight of a second flour, the second flour comprising waxy rice flour obtained from plants of the genus *Oryza*, and/or waxy rice starch, wherein the second flour comprises starch at a concentration of at least 60% based on the dry weight of the second flour, wherein the amylose content of the starch in the second flour is maximally 5% by dry weight of the starch, and wherein the amylose content of the waxy rice starch is maximally 5% by weight of the starch;

the method comprising the steps:
  a) mixing water and the one or more first flours, and the second flour comprising waxy rice flour and/or waxy rice starch at a temperature below 60° C., wherein the one or more first flours are native flours, and the second flour is a native flour, and the waxy rice starch is a native starch;
  b) heating the mixture from step a) from a temperature below 60° C. to a temperature ranging from 75 to 95° C., and keeping that mixture at that temperature during a time period of at least 2 minutes;
  c) adding the oil to the mixture from step b) and dispersing the oil in the mixture;
  d) optionally homogenising the mixture of step c) to create an oil-in-water emulsion wherein the oil droplets have a volume weighted mean droplet size D3,3 of less than 15 micrometer; and
  e) adding a food-grade acid to the mixture of step d), to a pH ranging from 3 to 5,
  wherein step b) further comprises creating a continuous matrix of gelatinised amylopectin from the starch of the second flour and/or the third waxy rice starch, the continuous matrix comprising amylose-rich inclusions.

2. The method according to claim 1, wherein step b) the mixture from step a) is at a temperature ranging from 60° C. to 70° C. during a time period of at least 10 seconds, and subsequently at a temperature between 70° C. and 95° C. during a time period of at least 10 seconds.

3. The method according to claim 1, wherein the composition is an edible emulsion.

4. The method according to claim 1, wherein the amount of oil in the composition ranges from 15 to 60% by weight.

5. The method according to claim 1, wherein the pulse seed is obtained from plants of one or more of the genera *Vigna, Lens* and *Cicer*.

6. The method according to claim 1, wherein the concentration of ingredients in the composition originating from egg is maximally 4% by weight.

7. The method according to claim 1, wherein the first flour comprises flour obtained from plants of one or more of the species *Solanum tuberosum* and *Manihot esculenta*.

8. The method according to claim 1, wherein the second flour comprises flour obtained from plants of the species *Oryza sativa*.

9. The method according to claim 1, wherein at least 20% of the starch from the first flour is present in the continuous matrix as partially or fully gelatinised starch granules.

10. A method for preparation of a composition in the form of an oil-in-water emulsion, the method comprising the steps:
  a) mixing water, one or more first native flours, and a native second flour containing a waxy rice flour and/or a native waxy rice starch at a temperature below 60° C., wherein the first flour comprises starch at a concentration of at least 35% based on the dry weight of the first flour, the amylose content of the starch ranging from 15% to 60% by dry weight of the starch and protein at a concentration of maximally 35% based on the dry weight of the first flour; wherein the second flour comprises starch at a concentration of at least 60% based on the dry weight of the second flour, the amylose content of the starch in the second flour is maximally 5% by dry weight of the starch; and wherein the amylose content of the waxy rice starch is maximally 5% by weight of the starch;
  b) heating the mixture from step a) from a temperature below 60° C. to a temperature ranging from 60° C. to 70° C. during a first time period of at least 30 seconds, and subsequently from a temperature ranging from 70° C. to 95° C. during a second time period of at least 30 seconds, thereby forming a continuous matrix of gelatinised amylopectin comprising partially or fully gelatinised starch granules localized therein;
  c) adding oil to the mixture from step b) and dispersing the oil in the mixture, using a high shear mixer;
  d) homogenising the mixture of step c) to create an oil-in-water emulsion wherein the oil droplets have a volume weighted mean droplet size D3,3 of less than 15 micrometer; and
  e) adding a food-grade acid to the mixture of step d), to a pH ranging from 3 to 5,
  wherein the first flour comprises flour obtained from plants of one or more of the genera *Solanum* and *Manihot* or from pulse seed having the following composition, calculated on dry weight of the raw pulse seed:
    35 to 60 wt % of starch;
    15 to 35 wt % of protein;
    0.8-10 wt % of lipids;
    1 to 40 wt % of dietary fiber, and
    0.5 to 12 wt % of sugars;
  wherein the second flour comprises flour obtained from plants of the genus *Oryza*; and
  wherein the composition comprises:
    (i) from 10% to 70% by weight of the oil;
    (ii) from 0.1% to 10% by weight of the acid;
    (iii) from 0.5% to 10% by weight of the one or more first flours, and
    (iv) from 0.5 to 10% by weight of the second flour and/or the native waxy rice starch.

11. The method according to claim 3, wherein the edible emulsion is a mayonnaise or dressing.

12. The method according to claim 5, wherein the pulse seed is obtained from plants of one or more of the species *Vigna radiata, Lens culinaris* and *Cicer arietinum*.

13. The method according to claim 1, wherein the composition is free from ingredients originating from egg.

* * * * *